United States Patent [19]

Higuchi et al.

[11] 4,171,869
[45] Oct. 23, 1979

[54] COLOR SEPARATION PRISM SYSTEM FOR COLOR TELEVISION CAMERA

[75] Inventors: Takeshi Higuchi, Omiya; Seiji Toyama, Ageo; Hiroshi Yamada, Tokyo, all of Japan

[73] Assignee: Fuji Photo Optical Co., Ltd., Omiya, Japan

[21] Appl. No.: 889,539

[22] Filed: Mar. 23, 1978

[30] Foreign Application Priority Data

Mar. 30, 1977 [JP] Japan .................. 52-35935

[51] Int. Cl.² .............................. G02B 21/14
[52] U.S. Cl. ...................... 350/173; 358/55
[58] Field of Search ............ 350/173, 55, 184; 358/55; 356/404

[56] References Cited

U.S. PATENT DOCUMENTS

| | | | |
|---|---|---|---|
| 3,824,004 | 7/1974 | Doi et al. | 350/173 |
| 3,905,684 | 9/1975 | Cook et al. | 350/173 |
| 4,072,405 | 2/1978 | Ozeki | 350/173 |

*Primary Examiner*—John K. Corbin
*Assistant Examiner*—B. Wm. de los Reyes

[57] ABSTRACT

In a color separation prism system for a color television camera, a bias light source is located at a position substantially displaced from one or the other of the two intersections of (i) a plane including the optical axis of the taking lens of the camera and perpendicular to the plane including the optical axes of the three color light beams incident to the pick up tubes and (ii) the two parallel edges of a prism block formed by the entrance face thereof to which the light from the taking lens of the camera is incident and the upper and lower parallel faces of the prism block parallel to the plane including the optical axes of the three color light beams. The color separation prism system is particularly suitable for use in a system in which the refractive index of the glass constituting the prism blocks is as high as 1.7.

3 Claims, 6 Drawing Figures

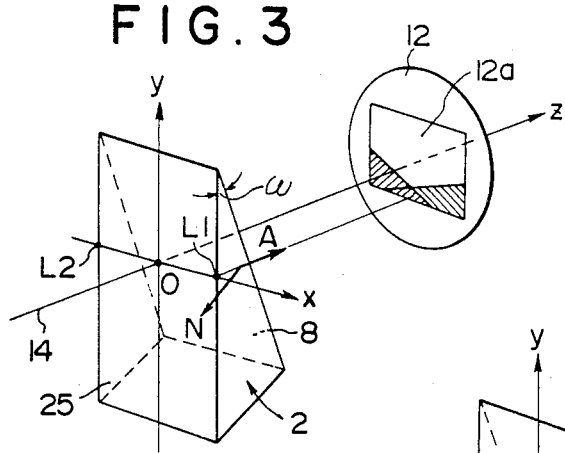
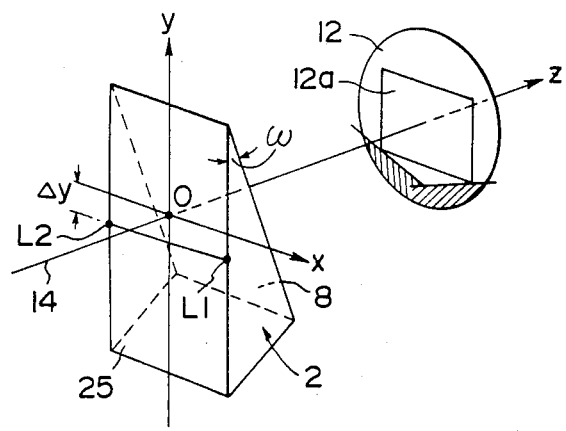
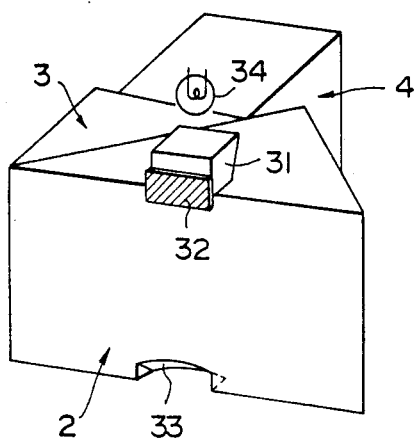
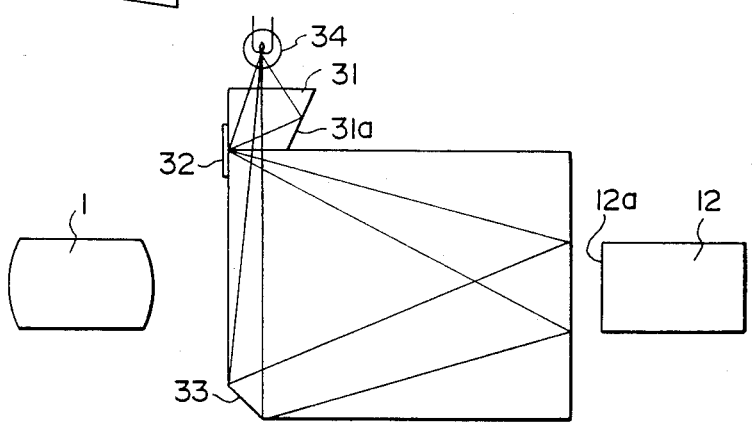

COLOR SEPARATION PRISM SYSTEM FOR COLOR TELEVISION CAMERA

BACKGROUND OF THE INVENTION

1. Field of the Invention

This invention relates to a color separation prism system for use in a color television camera, and more particularly to improvements in a color separation prism for use in a color television camera provided with a bias light source.

2. Description of the Prior Art

It has been known in the art to use a bias light means in a color separation prism system in a color television camera in order to eliminate residual images formed on the pick up tubes in the camera. The bias light is independent of the light from the object televised and is introduced to uniformly illuminate the face of the tubes to eliminate the residual images thereon. The art of using a bias light in a color television camera is disclosed, for instance, in U.S. Pat. No. 3,824,004.

On the other hand, various kinds of ENG (Electronic News Gathering) cameras for the purpose of gathering news have recently been developed. This kind of camera is desired to be compact and have a lens of a diameter as large as F:1.4 so as to be easily handled and operable in comparatively dark places. In order to make the camera as compact as possible, it is desirable to use glass of high refractive index on the order of nd=1.7 for the glass material of the prisms. By using a glass with a high refractive index such as nd=1.7, the volume of the color separation prism system can be reduced to ¼ to 1/5 that of the conventional color separation prism system using BK7 glass having a refractive index of nd=1.5168 when the diameter of the lens is made as large as F:1.4. Furthermore, by using glass of high refractive index to make the volume of the color separation prism system small, it is made possible to use a zoom lens system having a comparatively short back focal length, which facilitates the design and manufacture of the zoom lens system of a small size and high performance.

The color separation prism system using the glass of high refractive index which has the above described advantages, however, is disadvantageous in that when a bias light is introduced therein a total reflection occurs in the prism system and the three color image pick-up tubes for red, green and blue are not all equally exposed to the bias light.

SUMMARY OF THE INVENTION

The primary object of the present invention is, therefore, to provide a color separation prism system for a color television camera in which three color image pick-up tubes are equally exposed to bias light and a glass material having a high refractive index is used for the prisms.

Another object of the present invention is to provide a color separation prism system for a color television camera which makes possible the fabrication of a compact handy camera of high performance.

The above described objects of the present invention are accomplished by locating a bias light source in a color separation prism system made of glass of high refractive index at a position substantially displaced from one or the other of the two intersections of (i) a plane including the optical axis of the taking lens of the camera and perpendicular to the plane including the optical axes of the three color light beams incident to the pick-up tubes and (ii) two parallel edges of a prism block formed by the entrance face thereof to which the light from the taking lens of the camera is incident and the upper and lower parallel faces of the prism block parallel to the plane including the optical axes of the three color light beams.

BRIEF DESCRIPTION OF THE DRAWING

FIG. 3 is a perspective view showing a positional relation between a bias light source and a prism block wherein total reflection occurs and the photoelectric face of a pick-up tube is not uniformly exposed to the bias light, FIG. 4 is a perspective view showing a positional relation between a bias light source and a prism block wherein total reflection does not occur and the photoelectric face of a pick-up tube is uniformly exposed to the bias light, FIG. 5A is a perspective view of an embodiment of the color separation prism system in accordance with the present invention, and FIG. 5B is a developed view showing the optical path of the bias light beam in the color separation prism system as shown in FIG. 5A.

DESCRIPTION OF THE PREFERRED EMBODIMENTS

Now the present invention will be described in detail with reference to its principle of operation and preferred embodiments thereof.

Figure 1:
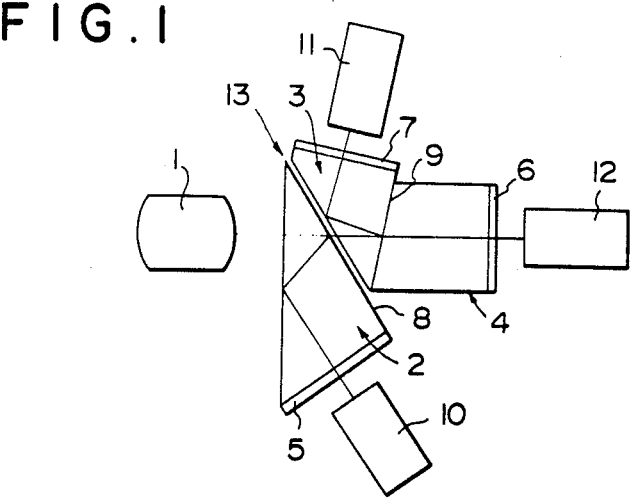
FIG. 1 is a plan view showing a color separation prism system of the type generally employed in color television cameras.

FIG. 1 shows the general structure of a color separation prism system for a color television camera. Referring to FIG. 1, behind a taking lens 1 is provided a prism system consisting of a first prism block 2 having a blue-reflecting dichroic face 8, a second prism block 3 having a red-reflecting dichroic face 9, and a third prism block 4. The first prism block 2 has an entrance face provided with a blue-trimming filter 5, the second prism block 3 has an entrance face provided with a red-trimming filter 7 and the third prism block 4 has an entrance face provided with a green trimming filter 6. Further, as is well known in the art, there is provided an air gap 13 between the first prism block 2 and the second prism block 3 so that the light reflected by the red-reflecting dichroic face 9 of the second prism block 3 is totally reflected by the entrance face of the second prism block 3 faced to said air gap 13. The image obtained by the taking lens 1 is focused on the photoelectric faces of three pick-up tubes 10, 11 and 12 for blue, red and green light beams.

Figure 2:
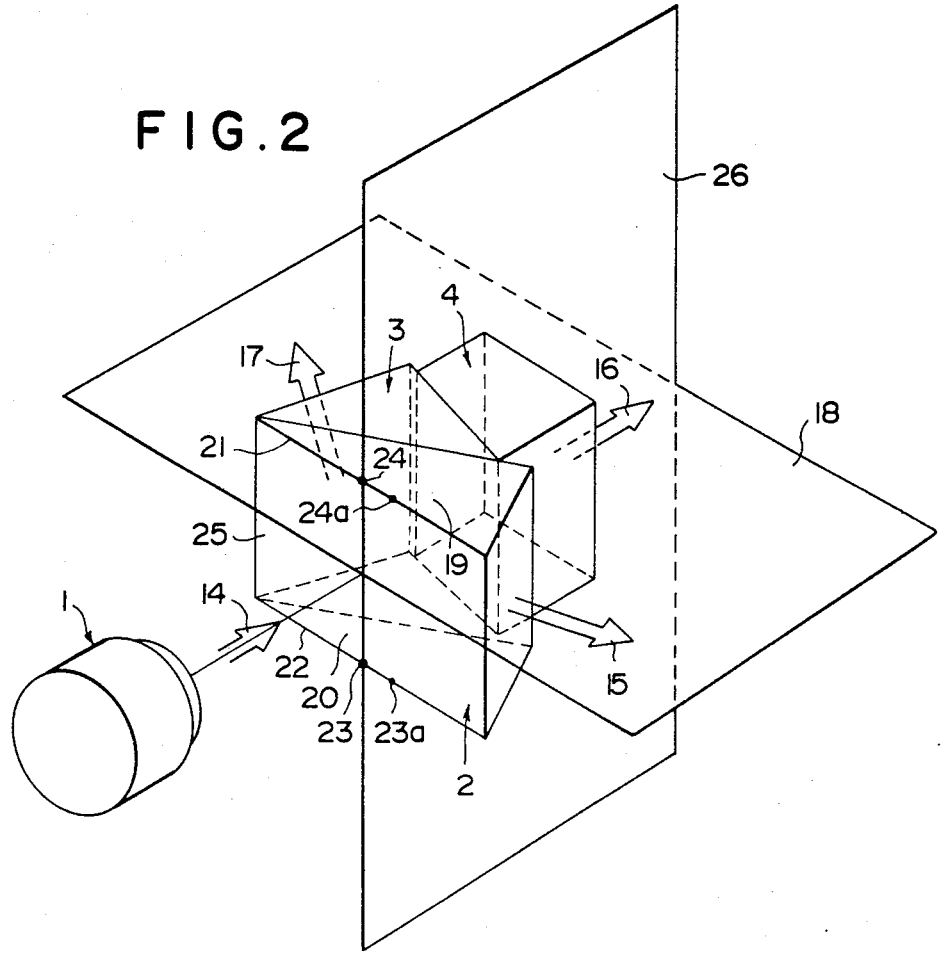
FIG. 2 is a perspective view of a color separation prism system in which the positions where a bias light source may be located are indicated.

In the color separation prism system as described above, a bias light source is usually located at one or both of the positions as shown by the reference numeral 23 or 24 in FIG. 2. The positions shown by the numerals 23 and 24 are intersections of (i) a plane 26 including the optical axis 14 of the taking lens 1 of the camera and perpendicular to the plane 18 including the optical axes 15, 16 and 17 of the three color light beams incident to the pick-up tubes 10, 12 and 11, respectively and (ii) two parallel edges 21 and 22 of the first prism block 2 formed by the entrance face 25 thereof to which the light from the taking lens 1 of the camera is incident and the upper and lower parallel faces 19 and 20 of the prism block 2 parallel to the plane 18 including the optical axes 15, 16 and 17 of the three color light beams.

When a glass material having a high refractive index on the order of nd=1.7 is used for the color separation prism system with a bias light source at such a position as described above, a total reflection occurs in the optical path of the light reflected by the face 8 of the first prism block 2 adjacent to said air gap 13 and consequently a part of the photoelectric face of the pick-up tube 11, for instance, is not exposed to the bias light.

The conditions for the occurrence of total reflection at the surface of the face 8 will hereinbelow be described with reference to FIG. 3.

Referring to FIG. 3, two bias light sources L1 and L2 are located at the positions 23 and 24 in FIG. 2 and the intersection 0 of the optical axis 14 of the taking lens 1 and the entrance face 25 of the first prism block 2 is assumed to be the origin of a three dimensional rectangular coordinate system having its x-axis extending in both the entrance face 25 and said plane 26 in FIG. 2, its y-axis extending in both the entrance face 25 and said plane 18 in FIG. 2 and its z-axis extending along the optical axis 14 of the taking lens 1.

Now assuming that a unit vector A is taken along the line from the light source L1 to a point P1($x_1, y_1, z_1$) on the photoelectric face 12a of the pick-up tube 12, the condition for occurrence of total reflection of the bias light from the light source L1 by the surface 8 of the prism block 2 is represented by the following formula $$|\cos^{-1} A \cdot N| > \theta \qquad (1)$$

where N is a vector normal to the surface 8 of the prism block 2 and $\theta$ is the critical angle of the prism block 2, and $$\begin{cases} A = (\frac{x - x_1}{\sqrt{(x - x_1)^2 + y^2 + Z_1^2}}, \frac{y}{\sqrt{(x - x_1)^2 + y^2 + Z_1^2}}, \frac{z_1}{\sqrt{(x - x_1)^2 + y^2 + Z_1^2}}) \\ N = (l, m, n) \ l, m \text{ and } n \text{ are direction cosines of } N. \end{cases}$$

The same condition also applies to the bias light L2.

The range in which the above conditions are satisfied is enlarged as the critical angle $\theta$ is decreased. Therefore, when the refractive index of the prism block 2 is large, the light which is to impinge upon the photoelectric face 12a of the pick-up tube 12 in the region indicated with hatching is totally reflected by the surface 8 of the prism block 2. This region of course changes as the apex angle $\omega$ of the prism block 2 changes. However, the apex angle $\omega$ of the prism block 2 in a color separation prism system is normally automatically determined in view of the brightness of the system desired and the desired position of the optical axes of the light emanating from the prism system. For instance, therefore, when the refractive index of the prism block 2 is nd=1.7, the apex angle will be $\omega \approx 23°$. Accordingly, the apex angle cannot be easily changed to change said region as desired.

Consequently, it is necessary to locate the bias light sources L1 and L2 at the positions displaced from said positions which are conventional in the color separating prism system provided with bias light means. FIG. 4 shows the positions of the bias light sources L1 and L2 displaced from the positions as shown in FIG. 3. The positions shown in FIG. 4 are displaced by $\Delta y$ from the positions shown in FIG. 4. By locating the bias light sources L1 and L2 at the displaced positions, the region where the photoelectric face is not exposed to the bias light is moved beyond the effective area of the photoelectric face 12a of the pick-up tube 12 as indicated by hatching in FIG. 4.

In other words, the positions of the bias light sources L1 and L2 are desired to be determined to satisfy the following conditions:

$$|\cos^{-1} A \cdot N| < \theta \qquad (2)$$

where $$A = (\frac{x - x_1}{\sqrt{(x - x_1)^2 + (y - \Delta y)^2 + z_1^2}},$$

$$\frac{y - \Delta y}{\sqrt{(x - x_1)^2 + (y - \Delta y)^2 + z_1^2}},$$

$$\frac{z_1}{\sqrt{(x - x_1)^2 + (y - \Delta y)^2 + z_1^2}})$$

The positions which satisfy the above condition are indicated at 23a and 24a in FIG. 2 for instance.

FIG. 5A shows an embodiment of the color separation prism system provided with a bias light source located at a position desired in accordance with the present invention, and FIG. 5B is a developed view of the optical path of a color light beam in the color separation prism system as shown in FIG. 5A. Referring to FIGS. 5A and 5B, a prism block 2 is provided with a small prism 31 having a reflecting face 31a. The small prism 31 is attached to the top surface of the prism block 2 at a position displaced from an imaginary plane by the distance $\Delta y$ which satisfies said formula (2). The imaginary plane is said plane 26 which includes the optical axis of the taking lens of the camera and is perpendicular to the plane including the optical axes of three color light beams incident to the three pick-up tubes for the three color light beams. The small prism 31 is located on an edge of the prism block 2 formed by the entrance face of the prism block 2 and the upper face thereof parallel to a plane including the optical axes of the three color light beams. The bias light is given by a bias light source 34 located in the vicinity of the small prism 31. The bias light is introduced into the small prism 31 and then into the prism block 2. In more detail, the bias light source 34 is located immediately above the small prism 31 as shown in FIG. 5B and the light therefrom is introduced into the prism block 2 by way of said reflecting face 31a of the small prism 31 and a reflecting or diffusing face 32 provided on the prism block 2. The reflecting or diffusing face 32 is a part of a surface of the prism block 2 which reflects or diffuses the light from the bias light source 34 by way of the top face of the small prism 31 and said reflecting face 31a toward the photoelectric face 12a of the pick-up tube 12 by way of said total reflection surface 8 of the prism block 2. The prism block 2 is further provided with a reflecting or diffusing face 33 cut into the edge of the prism block 2 formed by the entrance face and the bottom face thereof so that a part of the bias light from the bias light source 34 introduced into the prism block 2 is reflected thereby toward the tube 12.

The reflecting or diffusing faces 32 and 33 may be formed into a cylindrical shape so as to diverge the bias light reflected or diffused thereby. In FIG. 5A, the reflecting or diffusing face 33 is formed into a cylindrical shape convex to the light source 34 so as to effectively diverge the bias light reflected or diffused thereby and uniformly illuminate the whole area of the photoelectric face 12a of the pick-up tube 12.

By the provision of the bias light source 34 at the position as described above, the bias light is effectively guided toward the whole area of the photoelectric face 12a of the pick-up tube 12 without being totally reflected by the surface 8 of the prism block 2. Further, by providing the reflecting or diffusing face 33 in addition to the face 32, it becomes unnecessary to provide two bias light sources, thus facilitating the maintenance of the bias light source.

It should be noted that the present invention is directed to a color separation prism system consisting of prism blocks made of high refractive index glass but the high refractive index is not limited to said nd=1.7. The refractive index discussed in this invention should be understood to have a close relationship with the size of the photoelectric face of the pick-up tubes and the desired F-number of the system.

We claim:

1. A color separation prism system for use in a color television camera comprising a taking lens, a color separation prism system for separating a light beam from the taking lens into three color light beams, three pick-up tubes for the three color light beams and a bias light source for introducing bias light into the prism system to which the pick-up tubes are exposed, wherein the improvement comprises a bias light source located at a position displaced from one or other of the two intersections of a plane including the optical axis of said taking lens of the camera and perpendicular to a plane including optical axes of the three pick-up tubes, and two parallel edges of a prism block of the prism system formed by the entrance face thereof to which the light from the taking lens of the camera is incident and upper and lower parallel faces of the prism block parallel to the plane including the optical axes of the three color light beams; said prism block of the prism system being made of glass having a refractive index of as high as 1.7.

2. A color separation prism system for use in a color television camera as defined in claim 1 wherein said prism block is provided with one or a pair of reflecting or diffusing part for reflecting or diffusing light from said bias light source toward said three pick up tubes.

3. A color separation prism system for use in a color television camera as defined in claim 2 wherein said reflecting or diffusing part of the prism block is of cylindrical shape to diverge the light reflected or diffused thereby.

* * * * *